US006210145B1

(12) United States Patent
Seide

(10) Patent No.: US 6,210,145 B1
(45) Date of Patent: Apr. 3, 2001

(54) CALENDER FOR A MATERIAL SHEET FROM THERMOPLASTIC MATERIAL

(76) Inventor: Adolf Seide, Drachenfelsstrasse 3, 53721 Siegburg (DE)

( * ) Notice: Subject to any disclaimer, the term of this patent is extended or adjusted under 35 U.S.C. 154(b) by 0 days.

(21) Appl. No.: 09/198,769

(22) Filed: Nov. 24, 1998

(30) Foreign Application Priority Data

Nov. 27, 1997 (DE) .............................. 197 52 524

(51) Int. Cl.⁷ .................................. B29C 43/24

(52) U.S. Cl. .................. 425/194; 425/335; 425/363; 425/367

(58) Field of Search ............................. 425/42, 194, 335, 425/363, 367

(56) References Cited

U.S. PATENT DOCUMENTS

| 2,971,218 | * | 2/1961 | Bierer ................................... 425/367 |
| 4,997,358 | | 3/1991 | Perkins et al. ........................ 425/194 |
| 5,558,017 | | 9/1996 | Berger et al. ........................ 100/304 |

FOREIGN PATENT DOCUMENTS 5-98591  4/1993  (JP) .

* cited by examiner

Primary Examiner—Harold Pyon
Assistant Examiner—Donald Heckenberg
(74) Attorney, Agent, or Firm—Harness, Dickey & Pierce, P.L.C.

(57) ABSTRACT

A calender for thermoplastic material sheets has a frame (1) with rolls (8, 9, 14) for smoothing and cooling the thermoplastic material sheets. The rolls (8, 9, 14) are coupled with the frame (1). The roll (8) is held rotatably stationary. The rotatable roll (9) is radially adjustable with respect to the stationary roll (8). Additionally, the adjustable roll (14) is circumferenitially adjustable around the axis of rotation (X) of the stationary roll by guide cars (15, 16). The guide cars (15, 16) are provided at both ends on circular running paths of guide rails (2', 2", 3', 3"). The guide rails (2', 2", 3', 3") are connected to the frame or are part of it. Accordingly, a rigid support is achieved for the adjustable roll (14). Furthermore, an advantageous ease of access to the area of intake of the material sheet from the sheet die (B) into the calender is achieved. The frame (1) together with the guide rails (2', 2", 3', 3") pivot around a swivel axis which runs parallel to the axis of rotation (X) of the stationary roll (8). This enables adjustment of the frame (1) to different extrusion directions depending on the material used.

13 Claims, 4 Drawing Sheets

CALENDER FOR A MATERIAL SHEET FROM THERMOPLASTIC MATERIAL

CROSS-REFERENCE TO RELATED APPLICATION

This application is based upon and claims priority to German Patent Application 197 52 524.5 filed Nov. 27, 1997, which is herein expressly incorporated by reference.

BACKGROUND OF THE INVENTION

The invention relates to a calender for a thermoplastic material sheets extruded by an extrusion die via a sheet die.

U.S. Pat. No. 4,997,358 discloses a calender in which more than one roll is provided to smooth and cool the sheet of molten thermoplastic material extruded via the sheet die. The rolls are arranged on a frame. The plastic which is processed to a sheet needs an adaption of the guidance and of the dwell time of the material sheet in contact with the rolls to achieve the required thickness tolerance and required surface of the material sheet. Because of this at least one stationary roll and one adjustable roll, which can be set to different angular settings around the stationary roll, are provided. The adjustable roll is held in guide frames with its ends rotatable and radially adjustable to the stationary roll. The frames can be fixed on both sides of the stationary roll. The frames have discs with circumferentially distributed holes which receive bolts to secure the rolls internal ends. The radial external ends of the frames are attachable to carrier arms of the basic frame by bolts. As the discs act upon the bearings beddings of the stationary roll, they are further loaded. Furthermore, the accessibility of the adjustable roll as well as of the stationary roll is decreased.

SUMMARY OF THE INVENTION

The subject of the invention is to create a calender which stands out through a good handling and which enables the maintenance of tight tolerances for the processed material sheet.

To solve this problem, the calender includes a frame, with rolls for smoothing and cooling the material sheet. The rolls are provided at the frame. One roll is stationary and at least one is designed as an adjustable roll. The adjustable roll is arranged adjustable around and radially adjustable to the stationary roll.

Each adjustable roll is held rotatable at both its ends in bearings. Each of the two bearings is radially adjustably arranged on a guide car about the axis of rotation of the stationary roll. The guide cards of each adjustable roll arc supported on guide rails. The guide rails are separated from the bearing of the stationary roll. The guide rails are arranged at a distance from the stationary roll and have guideways for the guide cars. The guideways extend circularly around the axis of rotation of the stationary roll. Each adjustable roll is stepless circumferentially adjustable by means of the guide cars on the guide rails around the stationary roll. The guide rails are connected to the frame or form a part of it.

A good handling of the unit and a high rigidity for the support of the adjustable roll is arrived at by the separation of the support and of the guidance of each adjustable roll from the bearing (bedding) of the stationary rolls. Because of this, the bearings of the stationary roll stay uninfluenced. This also means that no forces are applied to the stationary roll by an additional support of the adjustable roll. Accordingly, this achieves high adjustment precision and maintenance of a tight toleranced gap between the stationary roll and the adjustable roll. Furthermore, the displacement, pivoting, of the adjustable roll around the stationary roll is also increased compared with a solution where the adjustable roll is fixed at the stationary roll. Thus, a very rigid bearing and support for the adjustable roll is achieved.

The characteristics of the different plastic materials make it desirable to adjust the intake of the hot material sheet exiting the sheet die to the rolls of the calender. There are materials which require an inclined or a straight downwardly directed exiting position of the sheet die. The exiting material sheet is subjected to high tensile stresses at a horizontal intake into the calender. Other materials require horizontal intake.

In the further development of the solution according to the invention, the frame together with the guide rails is pivotable around a swivel axis which runs parallel to the axis of rotation of the stationary roll. The circular running guide rails offer themselves for pivoting. These can be used for carrying out a pivoting adjustment. Thus, pivoting takes place via the periphery of the guide rails. Matching feeding ratios can be achieved by the pivotable arrangement where a laminating plastic sheet or a reinforcement sheet is fed. The swivel axis is preferably arranged such that it is identical to the axis of rotation of the stationary roll.

In the concretization of the adjustment of the adjustable roll at both ends of the adjustable roll, two guide rails forming a pair are arranged parallel to each other. One guide car is received between each pair. Each guide car has rollers which support it on inner and outer guideways of the guide rails. The narrow face of one guide rail of each pair of guide rails has teeth which engage a toothed pinion mounted on the attached guide car.

To achieve synchronization of the two guide cars for an exact parallel adjustment of the ends of the adjustable roll, the two pinions of the guide cars arranged at both ends of the adjustable roll are connected to each other by a shaft. One pinion is drivable by a power drive.

Finally, an arrangement is chosen where guide rails are arranged externally in the longitudinal direction of the adjustable roll. The rails have teeth on their radial outer narrow faces. The bearing of the frame to pivot around the axis of rotation of the stationary roll takes place in a further embodiment of the invention. The radially external narrow faces of the untoothed guide rails are carried by rollers mounted on a carrier frame. Two driving pinions are supported in bearings in the carrier frame to pivot the frame. The drive pinions both engage teeth on the radially external narrow face of the two teeth guide bars. Both pinions are driven by a joint drive unit so that synchronized pivoting takes place. The rollers which carry one of the untoothed guide rails are provided with rims for the side support towards the carrier frame. The rims embrace the sides of the associated guide rails. The other rollers which are assigned to the further untoothed guide rail are cylindrical. Jamming can be avoided by such an embodiment.

The calender preferably comprises three rolls. One of these represents the stationary and one the adjustable roll. The third roll is arranged in the frame and is only radially adjustable to the stationary roll. However, the third roll can also be designed and arranged as an adjustable roll.

Preferably, the carrier frame is height adjustable. This enables orientations towards the extruder in an even more flexible manner. Furthermore, the carrier frame can also be provided with runners which, for example, run on rails. A height adjustable arrangement of the runners on the carrier frame is advantageous.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment is shown schematically in the drawing wherein:

FIG. 2a is a detail section through the guiding roller.

DETAILED DESCRIPTION OF THE PREFERRED EMBODIMENT

Figure 1:
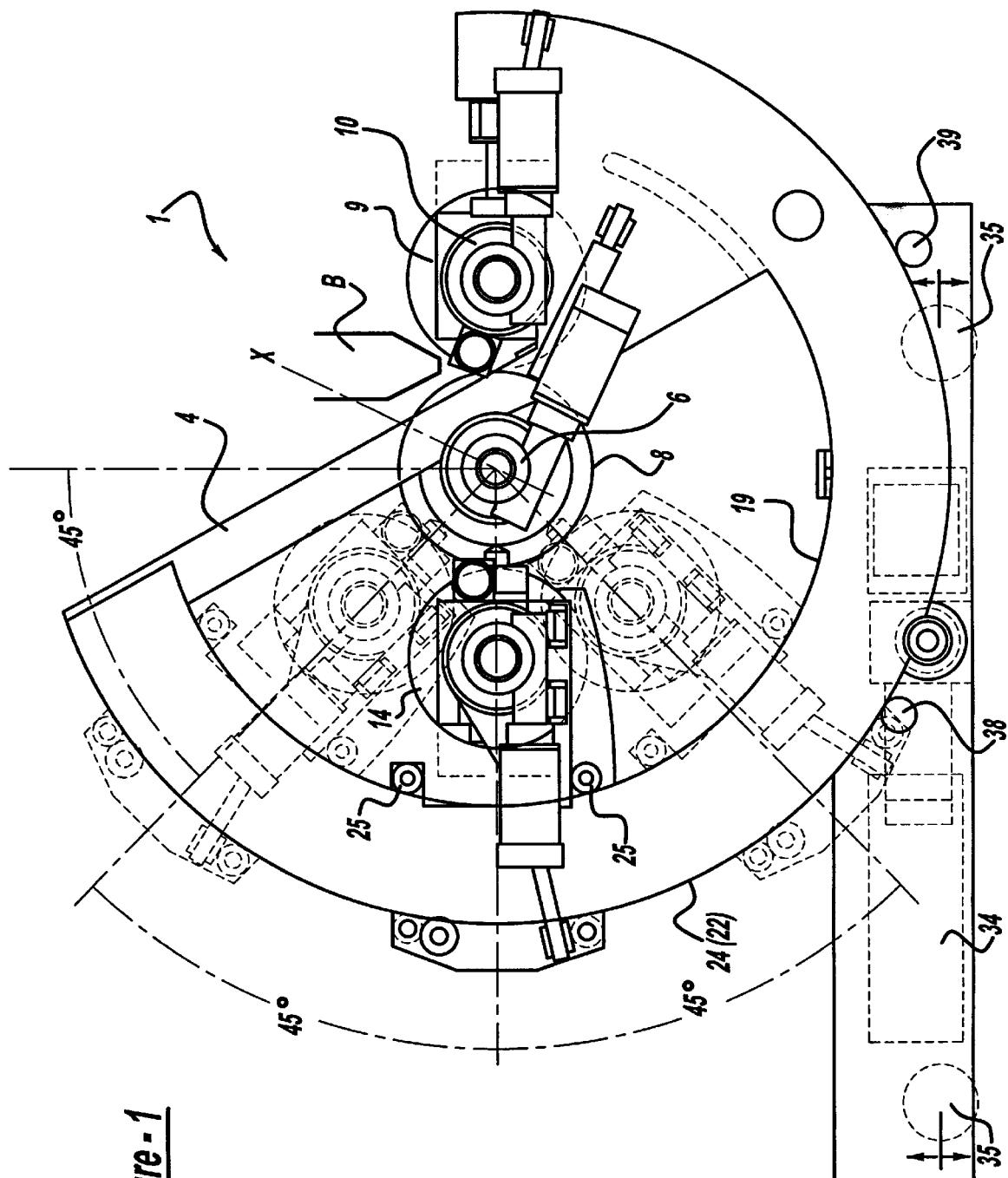
FIG. 1 is a side view of the calender in a first directional position according to the present invention.
Figure 2:
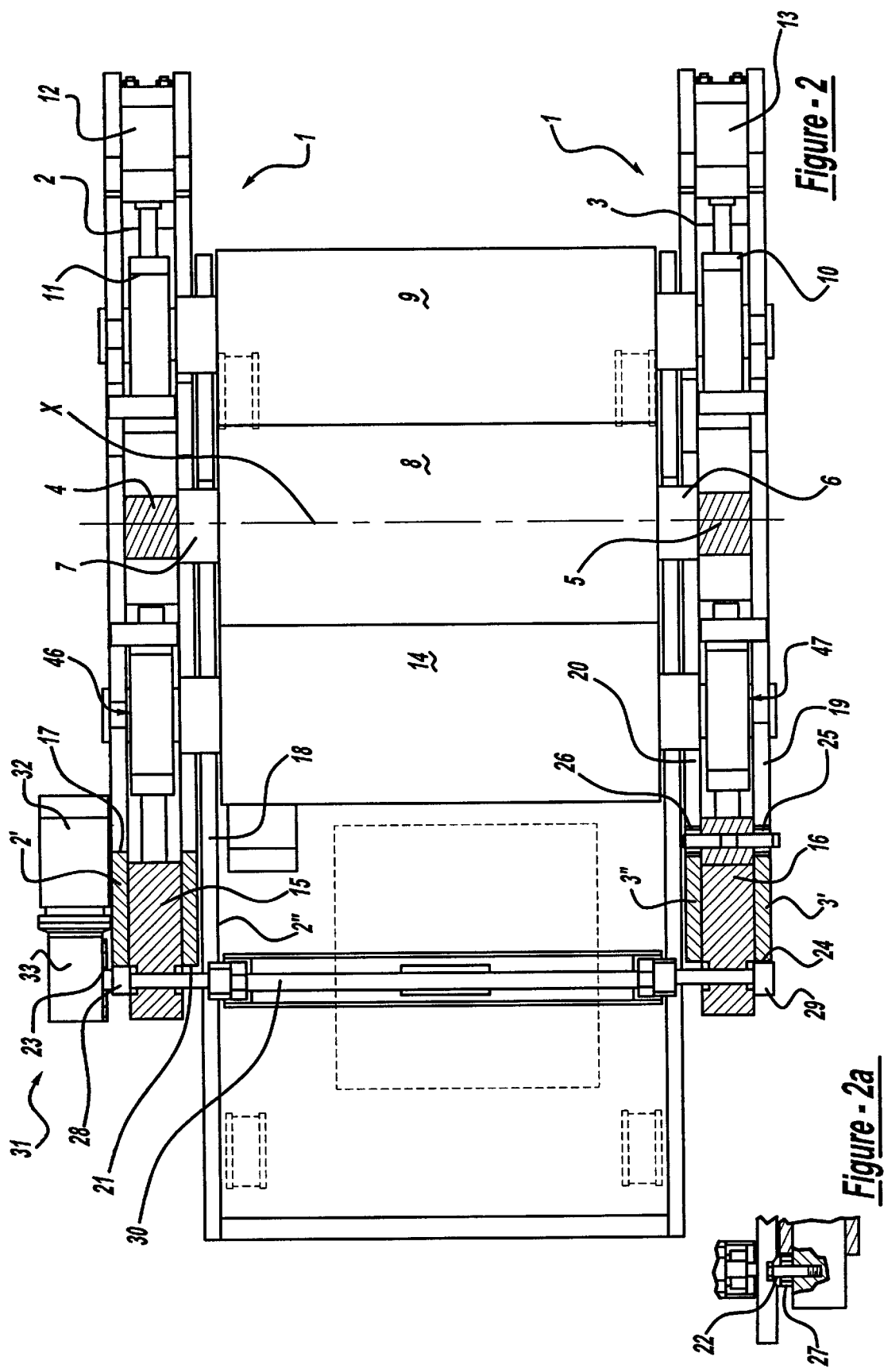
FIG. 2 is a sectional view of FIG. 1 along line 2—2 thereof.

The frame 1 is identifiable from FIGS. 1 and 2. The frame 1 includes a first guide rail pair 2. The guide rail pair has a first toothed guide rail 2' and a second toothless guide rail 2". The two guide rails 2' and 2" are arranged at a desired distance and parallel to one another. A second guide rail pair 3 is provided at a distance to the first guide rail pair 2. This guide rail pair 3 also includes a toothed guide rail 3' and an inner toothless guide rail 3". The guide rails 2', 2", 3' and 3" run in an arc. Accordingly, they describe an arc over a major part of their paths. The guide rails 2', 2", 3' and 3" are produced from a flat material. The two guide rail pairs each have a crossbeam 4, 5. The two guide rail pairs are located on the sides of the crossbeam. These run like a chord of a circle. Furthermore, the two guide rail pairs 2, 3 are connected to each other.

A stationary roll 8 is rotatable kept by bearings 6, 7 on the two crossbeams 4, 5. The roll 8 is drivable by a power drive. The stationary roll 8 defines an axis of rotation (X). Adjustable units 12, 13 are provided between the two guide rails 2', 2" respectively 3', 3" of the two guide rail pairs 2, 3. The units 12, 13 are used to adjust a roll 9. The roll 9 is held in bearings 10, 11. The adjustable units 12, 13 act upon the bearings 10, 11. The roll 9 is radially movable to the stationary roll 8. Thus, the adjustment units 12, 13 move the roll 9 to the axis of rotation (X).

An adjustable roll 14 is provided which is adjustable at the guide rail pairs 2, 3. The roll 14 is adjustable on a circular arc around the axis of rotation (X) of the stationary roll 8 by guide cars 15, 16. The adjustable roll 14 is carried at its ends by bearings 46, 47 arranged on the guide cars 15, 16. Further, the adjustable roll 14 is adjustably guided on the guide cars 15, 16 in a radial direction to the stationary roll 8. Guideways are provided to guide the guide cars 15, 16.

The guide rail pair 2 on the first toothed guide rail 2' has a radially inwardly positioned internal guideway 17. The guideway 17 is a circular arc, centered on the axis of rotation (X). The second toothless guide rail 2" has a radially inwardly positioned guideway 18. The guideway 18 is also a circular arc centered on the axis of rotation (X).

The second guide rail pair 3 has two internal guideways 19, 20. The internal guideway 19 is radially inwardly provided on the toothed guide rail 3'. The internal guideway 20 is radially inwardly provided on the toothless guide rail 3". Both guideways 19, 20 are designed as circular arc center around the axis of rotation (X).

The toothless guide rail 2" has an external guideway 21. The external guideway 21 is designed as a circular arc route with its center point centered on the axis of rotation (X) of the stationary roll 8. Further, the toothless guide rail 3" has an external guideway 22. The guideway 22 is a circular arc with its center point on the axis of rotation (X) of the stationary roll 8. The two toothed guide rails 2' and 3', which are externally arranged with respect to the adjustable roll 14, have an external narrow face, which runs in a circular arc, and includes teeth 23 and 24, respectively.

The guide cars 15, 16 are each arranged between the two guide rails 2' and 2", 3' and 3", respectively, of the two guide rail pairs 2 and 3. The basic member of each guide car 15, 16 has four inwardly positioned rollers 25, 26. The two rollers 25, arranged at a distance to each other, are intended to be supported on the internal guideway 19 of the toothed guide rail 3'. The two other rollers 26, arranged at a distance to each other, are intended to be supported on the internal guideway 20 of the toothless guide bar 3" in a corresponding manner. The guide car 16, in addition, is externally guided on two rollers 27 on the external guideway 22 of the toothless guide rail 3". In the same way, the guide car 15 is adjustable in a circumferential direction around the axis of rotation (X) of the stationary roll 8 in relation to the first guide rail pair 2 on the guide rails 2', 2".

A geared pinion 28, 29 is coupled with each guide car 15, 16 to enable circumferential displacement of the guide cars 15, 16. The two pinions 28, 29 are connected to each other via a shaft 30. The pinion 28 is drivable by a power drive 31. This arrangement guarantees synchronous displacement of both guide cars 15, 16. The pinions 28, 29 are engaged with the teeth 23, 24 of the toothed guide rails 2', 3'. A power drive 31 including a motor 32 and an angle transmission 33 is coupled with the pinion 28.

FIG. 2a shows a detail section through the guiding roller 27. Thus, the guide car 16 is guided by the roller 27 on the external guideway 22 of the toothless guide rail 3".

Figure 3:
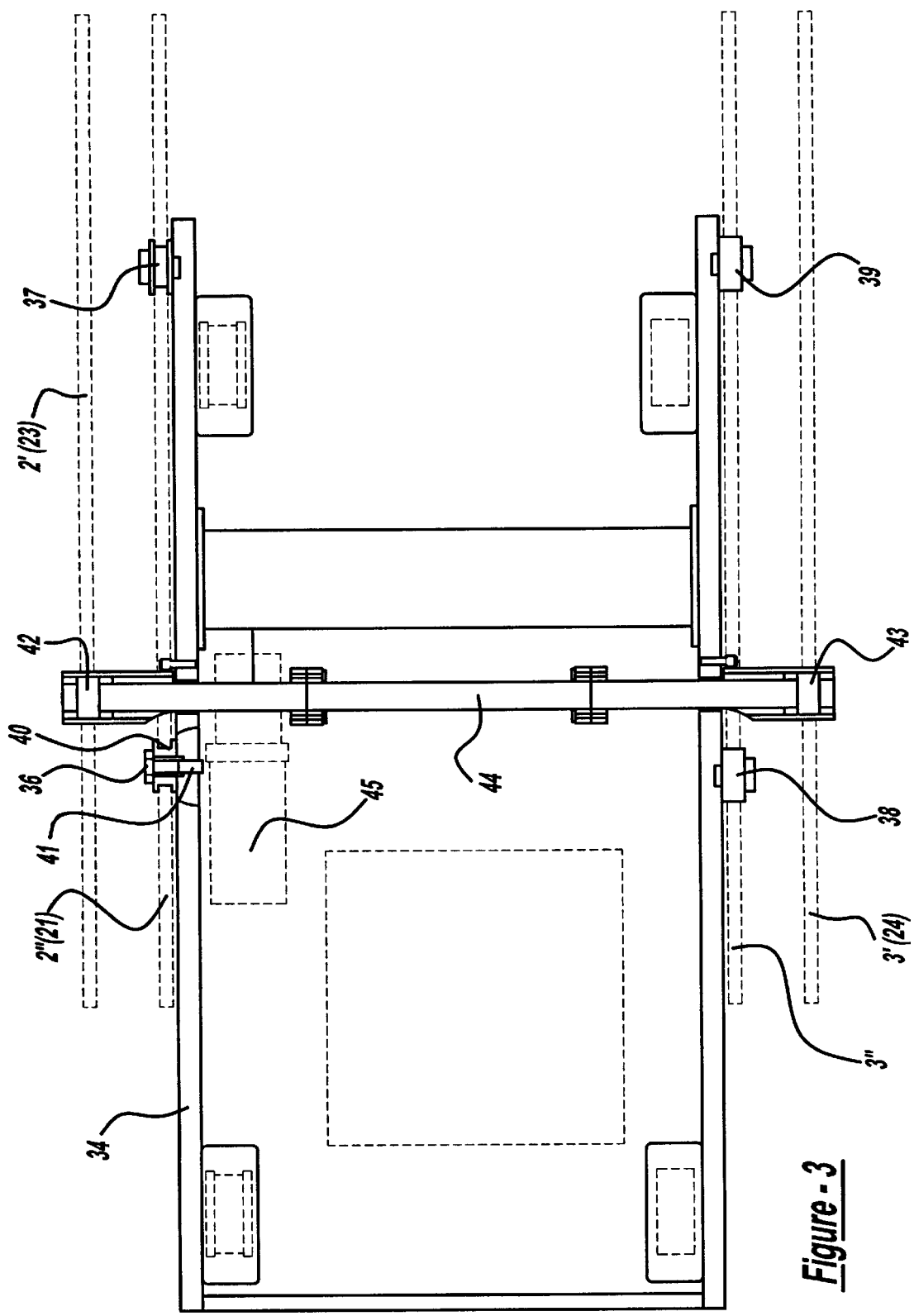
FIG. 3 is a plan view of the carrying frame with the drive to the pivoting position of the frame.

As can be gathered from FIGS. 1 and 3, the frame 1 rests on carrier rollers 36, 37, 38, 39 of the carrier frame 34. The two toothless guide rails 2" and 3" enable the frame to pivot around the axis of rotation (X) of the stationary roll 8. The carrier frame 34 is movable on runners 35. The runners 35, for example, may run on tracks. The runners 35 are height adjustable to adjust the height position of the carrier frame 34. This is indicated by the arrows. FIG. 3 further shows that the carrier rollers 36, 37 which support the toothless guide rail 2" include rims 40, 41. The rims 40, 41 embrace the guide rail 2" on its sides. Thus, the toothless guide rail 2" is held in the direction of the axis of rotation X. Accordingly, the frame 1 is held by the carrier rollers 36, 37 in the direction of the longitudinal axis (X). The frame 1, via the guide rail 2" external guideway 21, arranged around circular path about the axis of rotation (X) is supported on the circumference of the cylindrical carrier rollers 36, 37. The rollers 36, 37 are also arranged at a distance with respect to one another. Due to the cylindrical rollers 36, 37, jamming does not occur. The guide rail 3", via external guideway 22, which is an arc of a circle, is supported on the outer circumference of cylindrical carrier rollers 38, 39. Guidance of the frame 1 in the direction of the axis of rotation occurs by the two carrier rollers 36, 37.

A pivotable drive provides pivotable adjustment of the frame. The frame may be adjusted from a position in accordance with FIG. 2 into a position in accordance with FIG. 4. This pivot drive includes two driving pinions 42, 43 which rest on the carrier frame 34 as seen in FIG. 3. The driving pinions 42, 43 are jointly drivable by a driving unit 45 via a driving shaft 44. The shaft 44 connects the pinions 42, 43. The driving unit 45 also includes a motor and a gearbox. The driving pinions 42, 43 engage with teeth 23, 24 of the two guide rails 2" and 3".

In FIG. 1, the sheet die (B) is shown in outline. The nozzle end of the sheet die is vertically directed downwards. The two rolls 8, 9 are horizontally arranged to be able to take up the material sheet exiting the sheet die (B). The material sheet is then turned clockwise around the stationary roll 8, until it meets the adjustable roll 14. The sheet is lead away from the adjustable roll 14 in a counter-clockwise direction. The angle of contact of the stationary roll 8 by the material sheet can be changed by displacement of the guide cars 15, 16 on the guide rail pairs 2, 3. Here, the contact length to the stationary roll 8 can be changed to achieve wanted cooling.

Figure 4:
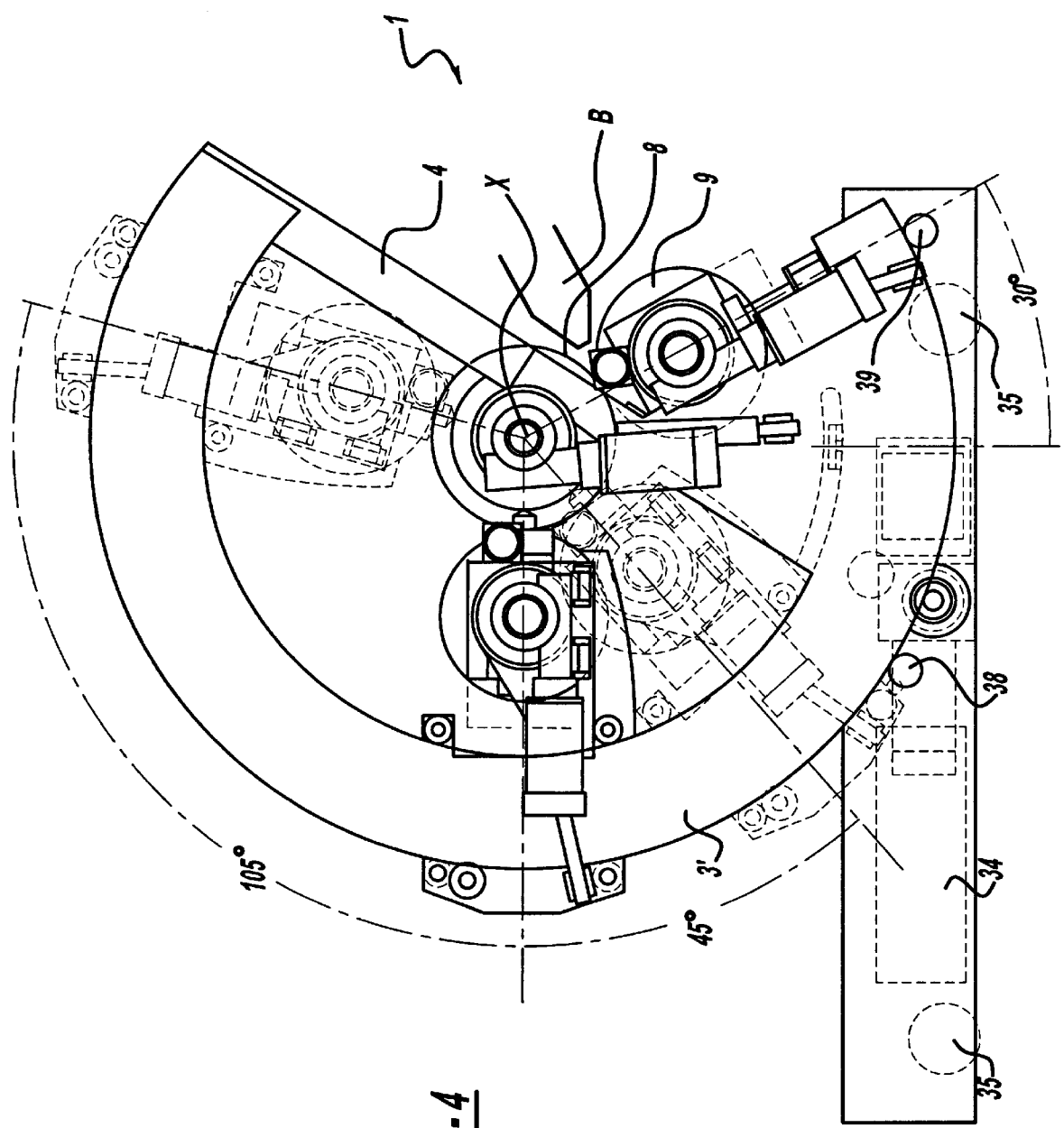
FIG. 4 is a view like FIG. 1 in a position pivoted to the right.

FIG. 4 illustrates a position of the rolls 8, 9 where the sheet die (B) is in an extrusion position to exit the melt. This position is dictated by the material viscosity and other characteristics. Here, the complete frame I is pivoted around the axis of rotation (X) into the position which is shown in FIG. 4. The guide rails 2" and 3" move on the carrier rollers 36, 37, and 38, 39, respectively, of the carrier frame 34, when the pivot drive, which comprises the driving unit 45, the driving pinions 42, 43 and the driving shaft 44 is actuated.

While the above detailed description describes the preferred embodiment of the present invention, the invention is susceptible to modification, variation and alteration without deviating from the scope and fair meaning of the subjoined claims.

What is claimed is:

1. A calender for a material sheet of a thermoplastic material extruded by an extruder via a sheet die, comprising:

a frame, a plurality of rolls for smoothing and cooling the material sheet coupled with the frame, a first roll being stationary, at least one second roll is adjustable, said second roll is arranged adjustable around and radially adjustable to the first stationary roll, each second adjustable roll is held rotatable at both its ends in bearings, said bearings being adjustably arranged on a guide car radially to an axis of rotation of the first stationary roll, said guide cars of each second adjustable roll being supported on arcuate guide rails separated from the bearing of the first stationary roll, said guide rails separated from the bearing of the first stationary roll, said arcuate guide rails arranged at a distance from the first stationary roll and having guideways for the guide cars extending in an arcuate path around the axis of rotation of the stationary roll, and each said second adjustable roll is stepless circumferentially adjustable by means of the guide cars on the guide rails around the stationary roll and said guide rails are connected to the frame.

2. The calender of claim 1, wherein the frame, together with the guide rails, are pivotably adjustable around a pivot axis, said pivot axis extending parallel to the axis of rotation of the first stationary roll.

3. The calender of claim 2, wherein the frame, together with the guide rails, are pivotably adjustable around a pivot axis wherein said pivot axis is the same as the axis of rotation of the first stationary roll.

4. The calender of claim 1, wherein at both ends of the second adjustable roll two guide rails, forming a pair, are arranged parallel to each other, a guide car is received between each guide rail, each said guide car has rollers for being supported on inner and outer guideways of the guide rails and wherein a face of one guide rail of each pair of guide rails has teeth engaging a toothed pinion mounted on the attached guide car.

5. The calender of claim 4, wherein the two pinions of the guide cars are arranged at both ends of the second adjustable roll and said pinions being connected to each other via a shaft and wherein one pinion is driven by a power drive.

6. The calender of claim 4, wherein the outer guide rails in the longitudinal direction of the second adjustable roll having said teeth at their radially external faces.

7. The calender of claim 4, wherein for pivoting the frame the radially external guideways of the toothless guide rails are resting on rollers which are connected to a carrier frame.

8. The calender of claim 7, wherein two driving pinions on the carrier frame and each driving pinion being engaged with one of said teeth of the two toothed guide rails and coupling with a common drive.

9. The calender of claim 7, wherein carrier rollers carrying one of the toothless guide rails including rims which embrace the side of the associated guide rail.

10. The calender of claim 1, including three rolls, a third roll being arranged on the frame, and said third roll only radially adjustable relative to the stationary roll.

11. The calender of claim 7, wherein the carrier frame being height adjustable supported.

12. The calender of claim 7, wherein the carrier frame is movably arranged on runners.

13. The calender of claim 11, wherein the carrier frame is provided with height adjustable runners.

\* \* \* \* \*